Dec. 7, 1965  E. D. LOBB  3,222,585
SHUNT MOTOR CONTROL WITH CURRENT LIMITER
Filed Feb. 13, 1962
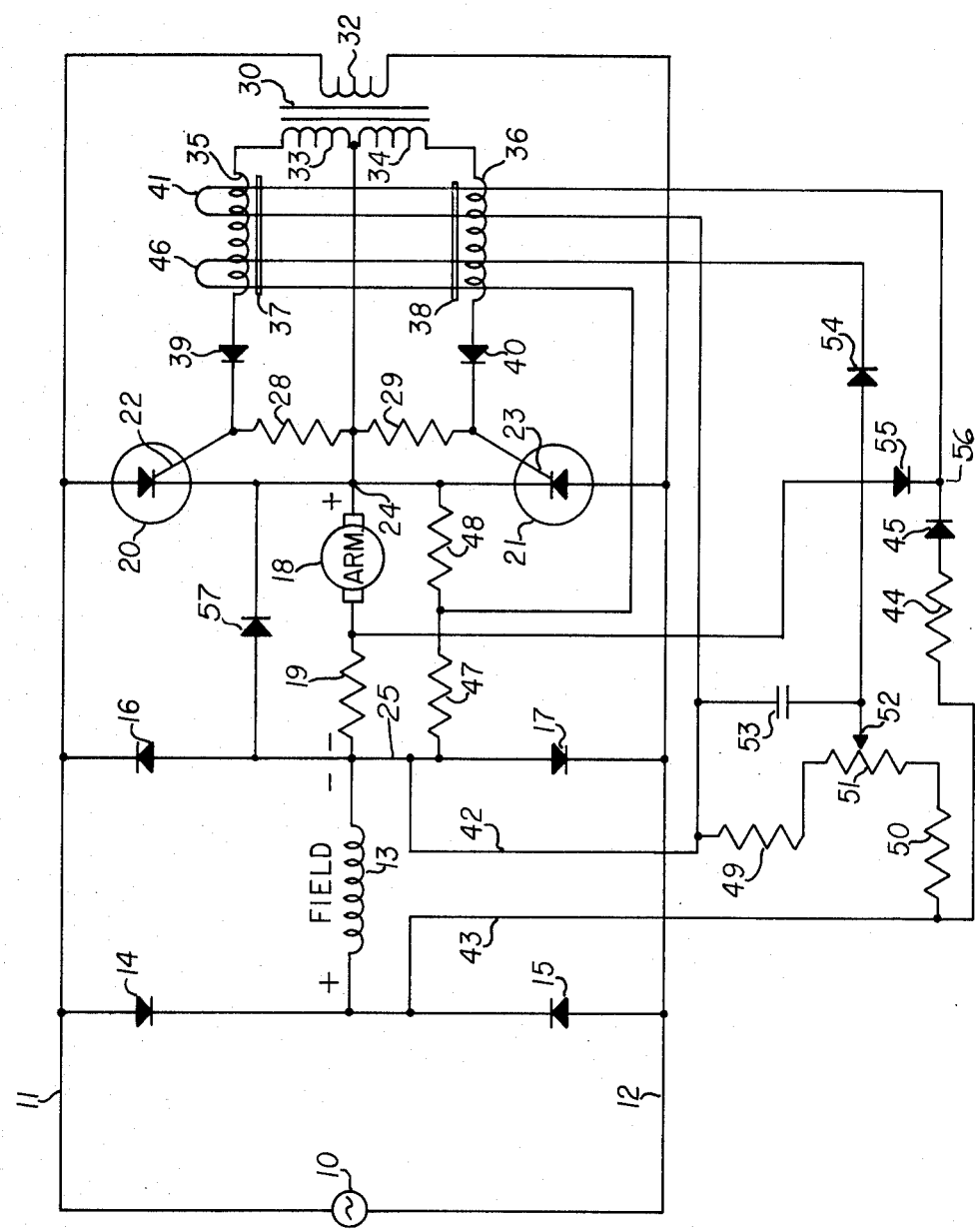
EARL D. LOBB
INVENTOR
BY John G. Graham

United States Patent Office 3,222,585
Patented Dec. 7, 1965

3,222,585
SHUNT MOTOR CONTROL WITH CURRENT
LIMITER
Earl D. Lobb, Garland, Tex., assignor to Texas Instruments Incorporated, Dallas, Tex., a corporation of Delaware
Filed Feb. 13, 1962, Ser. No. 173,025
6 Claims. (Cl. 318—308)

This invention relates to a control system for supplying current to a load from an alternating current source. More particularly, this invention relates to a current limiting arrangement for a D.C. shunt motor control circuit employing saturable reactors in the gate circuits of controlled rectifiers.

D.C. shunt motor control systems using controlled rectifiers are set forth in the copending applications Serial No. 187,412, filed April 13, 1962, and Serial No. 170,013, filed January 31, 1962, which are assigned to the assignee of the present invention. These systems are adapted to maintain a substantially constant motor speed as selected by a speed setting device. As the load on a motor increases in these systems, however, the current required to maintain the set speed increases, and so some means must be provided to prevent the armature current from exceeding the rated values of the controlled rectifiers or other elements in the armature circuit. Further it is frequently desirable to limit the torque exerted by a motor due to load considerations; or to control the accelerating time, both of which results are attained by limiting the value of armature current. In addition, such current limiting would have a desirable result in the event of field excitation failure. Also, such current limiting is particularly desirable during starting, reversing or jogging.

It is a principal object of this invention to provide a current limiting arrangement for a supply system employing semiconductor controlled rectifiers. Another object is to provide a current limiter for a D.C. shunt motor control system which is simple and inexpensive and requires a minimum of components. A further object is to provide an arrangement adapted to prevent the armature current in a shunt motor circuit from exceeding a selected value.

In accordance with this invention, a controlled rectifier is connected in series with a variable load and an alternating current source. The current limiting feature is provided by sensing the load current and varying the character of the firing potentials applied to the control element of the rectifier in accordance therewith. Specifically, in a circuit using a saturable core reactor along with an A.C. source in the gate-cathode circuit of the rectifier, the current limiter arrangement may be adapted to bias the saturable core in such a direction as to prevent firing of the rectifier.

The novel features believed characteristic of this invention are set forth in the appended claims. The invention itself, however, along with further objects and advantages thereof, may best be understood from the following description of a particular embodiment, when read in conjunction with the accompanying drawing wherein:

The single figure is a schematic diagram of a shunt motor control circuit incorporating the principal features of this invention.

With reference to the figure, a shunt motor circuit is illustrated which utilizes the armature current limiting feature of this invention. An alternating current source 10 is connected to a pair of input supply lines 11 and 12, while a shunt field 13 of the motor is connected to these lines by a full-wave bridge rectifier including four diodes 14–17. An armature winding 18 for the shunt motor, in series with a current sensing resistor 19, is connected to the supply lines 11 and 12 by a second full-wave bridge rectifier including a pair of controlled rectifiers 20 and 21 along with the diodes 16 and 17. The controlled rectifiers 20 and 21 are of the PNPN silicon type and include anodes connected to the lines 11 and 12, gates 22 and 23, and cathodes connected together at a junction 24. A junction 25, between the diodes 16 and 17 which are common to both bridges, provides a common negative terminal for both the field and the armature. With the arrangement thus far described, it is seen that direct current, or full-wave rectified alternating current, will be supplied to the field winding 13 at substantially constant value while pulsating unidirectional current will be supplied to the armature winding 18 to the extent that the controlled rectifiers 20 and 21 are conductive during alternate half cycles.

Firing potentials for the gates 22 and 23 are supplied by a saturable reactor arrangement similar to that illustrated in the above-mentioned copending application Serial No. 187,412. The gates 22 and 23 are shunted to the common point 24 by pair of like resistors 28 and 29. A transformer 30 is utilized having a primary winding 32 connected across the lines 11 and 12 or to the supply 10. This transformer includes a pair of secondary windings 33 and 34 having a common point connected to the junction 24 of the cathodes. The outer terminals of the secondary windings are connected to the gates 22 and 23 through windings 35 and 36 on saturable cores 37 and 38 and series diodes 39 and 40. With this arrangement, the cores 37 and 38 tend to be saturated by current through the windings 35 and 36 in the directions permitted by the diodes 39 and 40. Thus, absent bias for the cores, these windings 35 and 36 offer little impedance, and the gates 22 and 23 would thus be driven with voltages adequate to fire the controlled rectifiers at the beginning of each alternate half cycle. It is preferable to bias the controlled rectifiers toward nonconduction, and so a bias winding 41 encircles both of the saturable cores 37 and 38 and is driven by bias current adequate to reset the cores after each alternate half cycle. The bias winding 41 is excited by a reference potential which may be derived from across the field 13, this being across the output of the first bridge rectifier. This voltage is applied by a pair of lines 42 and 43 through a resistor 44 and a diode 45 to the bias winding 41. Current thus provided would saturate the cores 37 and 38 in a direction opposite to the flux produced by the windings 35 and 36, and so would prevent firing voltages from appearing on the gates 22 and 23 unless further control current is provided to oppose the bias, at least in part.

This control current is provided by a control winding 46 encircling the cores. One end of the control winding is connected to a voltage divider including a pair of resistors 47 and 48 which are connected across the armature to sense the armature voltage. The other end of the winding 46 has applied thereto a reference voltage derived by means of a voltage divider including fixed resistors 49 and 50 and a variable potentiometer 51. This voltage divider is connected across the field or across the lines 42 and 43. A movable tap 52 on the potentiometer 51 is shunted by a capacitor 53 and is coupled by a diode 54 to the control winding 46. The reference voltage established by the position of the tap 52 will cause current to flow through the diode 54, the control winding 46 and back through the resistor 47 to the negative terminal 25. If no voltage is present across the armature 18, then this current through the control winding will tend to cancel that in the bias winding and allow at least some saturation of the cores 37 and 38 so that the controlled rectifiers 20 and 21 will be fired during each alternate half cycle. The setting of the potentiometer 51 determines what point in the half cycle the cores saturated, allowing firing potentials to be applied at the gates. As the motor speed builds up, however, the armature voltage increases, producing a positive voltage across the resistor 47 which bucks the reference voltage applied to the control winding from the tap 52. The motor speed will seek a balance condition wherein the portion of the armature voltage which appears across the resistor 47 bears some fixed ratio to the voltage between the tap 52 and the line 42, the difference being adequate to allow enough controlled rectifier current to flow during each half cycle so that the desired speed of the motor will be maintained for any load condition.

The capacitor 53 acts as a time delay mechanism to prevent the voltage on the control winding 46 from increasing in a step function when the setting of the tap 52 is charged. This permits the change in the firing angles of the controlled rectifiers to be gradual, more nearly matching the inertia of the armature and load.

As the load on the motor increases, the control arrangement, of course, tends to maintain the motor speed constant, and this would require an increase in the motor armature current. In order to prevent the armature current from exceeding the rated values of the various components in the armature circuit, the circuit of this invention includes a current limiting feature. The junction between the armature 18 and the series resistor 19 is connected to the bias winding 41 by a diode 55. As the armature current increases, the voltage across the resistor 19 likewise increases, and when this voltage exceeds the normal bias voltage applied between a point 56 and the line 42, the diode 55 will begin to conduct. This will result in an increased bias current in the winding 41, tending to further oppose the flux provided by the windings 35 and 36 and thus tending to maintain the controlled rectifiers 20 and 21 in a cutoff condition.

In addition to the current limiting operation, this circuit also provides torque limiting and timed acceleration. The motor torque will be directly related to product of the armature current and field flux. Thus, by limiting armature current to some selected maximum, a maximum torque value is also determined. The armature acceleration is directly related to the difference between motor torque and load torque, and inversely related to the armature and load inertia. Thus, by limiting armarture current, acceleration will be likewise controlled.

Controlled rectifiers may be turned on by applying a spike of voltage between anode and cathode, regardless of gate voltage. This spike may occur when the power on-off switch is closed, in which case the rectifier 20 may start conducting and, due to the armature inductance, continue to conduct in a closed path including the diode 16, even after the polarity of the source changes and in spite of the current limiting and control arrangement. To prevent this, a diode 57 shunts the armature circuit in a reverse direction. This prevents the point 25 from ever being positive with respect to the point 24.

Although the particular values of the circuit elements used in a given application would depend upon the various requirements thereof, an example of a practical embodiment of this invention may utilize the following components:

| Component | Unit | Value |
|---|---|---|
| Source 10 | volts A.C. | 115 |
| Diodes 14 and 15 | | 1N547 |
| Diodes 39, 40, 45, 54, 55 and 57 | | TI55 |
| Resistor 19 | ohm | 0.1 |
| Resistors 29 and 30 | do | 47 |
| Resistor 47 | do | 330 |
| Resistor 48 | do | 2000 |
| Resistor 49 | do | 50 |
| Resistor 50 | do | 820 |
| Resistor 51 | do | 2000 |
| Resistor 44 | do | 5400 |
| Capacitor 53 | $\mu$fd | 250 |
| Controlled Rectifiers 20 and 21 | | TI153 |

The bias voltage for the bias winding 41 is described above as being derived from across the field winding which is merely a convenient D.C. source in the circuit shown. Obviously, this bias voltage, as well as the reference voltage for the control winding, could be provided by a separate source. For example, another secondary winding on the transformer 30, along with a rectifier, could provide the input to the lines 42 and 43. Also, the field 13 may be excited by a D.C. source separate from the bridge which supplies the armature, rather than using the bridge which has two diodes in common with the armature rectifier. More significant, the field, which ordinarily would include a separate winding for each pole, may use only the diodes 16 and 17 in the armature bridge, eliminating the necessity for the diodes 14 and 15. That is, in accordance with the invention of the copending application TI–1403, assigned to the assignee of the present invention, the field winding for one pole of a two-pole motor could be connected across diode 16, while the field winding for the other pole would shunt the diode 17. In this case, a separate source for the bias and control voltages would be used as mentioned above.

Accordingly, although this invention has been described with reference to a particular embodiment, this description is not meant to be construed in a limiting sense. It is, of course, understood that various modifications may be made by persons skilled in the art, and so it is contemplated that the appended claims will cover any such modifications as fall within the true scope of the invention.

What is claimed is:

1. A motor control circuit comprising:
    (a) an alternating current source,
    (b) a controlled rectifier having an anode, a cathode and a gate, said anode being connected to one side of said source,
    (c) a motor armature winding connected between said cathode and the other side of said source,
    (d) a saturable core reactor coupled between said source and gate of said controlled rectifier,
    (e) a bias winding and a control winding encircling the core of said reactor,
    (f) a bias voltage source coupled to said bias winding to provide current therein tending to bias said core in a direction opposing conduction through said reactor from said source to said gate,
    (g) means responsive to current in said armature winding and adapted to provide additional bias current in said bias winding when the armature winding current exceeds a predetermined level,
    (h) a variable reference source to provide a voltage related to the desired motor speed,
    (i) and a resistor coupled across the armature winding and exhibiting a potential thereon related to the armature winding voltage, said resistor and said reference source being connected in series opposition across said control winding to provide current therein tending to bias said core in a direction opposite to the effect of said bias winding.

2. In power supply apparatus:
    (a) an A.C. source,
    (b) a semiconductor controlled rectifier having an anode, a cathode and a gate,
    (c) a variable load connected in series with said A.C. source and the anode and cathode of said controlled rectifier,
    (d) a saturable core reactor coupled between said A.C. source and the gate of said controlled rectifier,
    (e) first and second winding means encircling the core of said reactor,
    (f) voltage source means coupled to said winding means tending to provide flux in said core related in magnitude to a desired load condition and in a direction opposing the flux produced by current flowing in said reactor from said A.C. source to said gate, (g) first feedback means coupled to said first winding means tending to provide flux in said core related in magnitude to an actual load condition and in a direction opposing that provided by said voltage source means, said first feedback means comprising at least two separate current paths feeding said first winding means, (h) and second feedback means coupled to said second winding means tending to provide flux in said core related in magnitude to another load condition and in the same direction as that provided by said voltage source means.

3. A motor speed control circuit comprising:
(a) an A.C. source,
(b) a semiconductor controlled rectifier having an anode, a cathode and a gate,
(c) an armature winding for the motor connected in series with said A.C. source and the anode and cathode of said controlled rectifier,
(d) a saturable core reactor coupled between said A.C. source and the gate of said controlled rectifier,
(e) first and second winding means encircling the core of said reactor,
(f) voltage source means coupled to said winding means tending to provide flux in said core related in magnitude to a desired motor speed and in a direction opposing the flux produced by current flowing in said reactor from said A.C. source to said gate,
(g) first feedback means coupled to said first winding means tending to provide flux in said core related to the actual motor speed and in a direction opposing that provided by said voltage source means, said first feedback means comprising at least two separate current paths feeding said first winding means,
(h) and second feedback means coupled to said second winding means tending to provide flux in said core when the motor armature current exceeds a predetermined value, this flux being in the same direction as that provided by said voltage source means.

4. A shunt motor control circuit comprising:
(a) an alternating current source,
(b) a first bridge rectifier including a diode in each of the four legs thereof and having opposite terminals connected to said source,
(c) a field winding for said shunt motor connected across the remaining terminals of said first bridge rectifier,
(d) a second bridge rectifier including two of said diodes from said first bridge rectifier in two of the four legs thereof and including a controlled rectifier in each of the remaining two of the four legs thereof, said second bridge rectifier having opposite terminals connected to said source,
(e) an armature winding for said shunt motor connected across the remaining terminals of said second bridge rectifier,
(f) means coupled to said source adapted to provide firing currents to the gates to said controlled rectifiers through a pair of saturable core reactors,
(g) a bias winding and a control winding encircling the cores of said pair of reactors,
(h) a reference voltage source coupled to said bias winding to provide current therein tending to bias said core in a sense opposing conduction through said reactors from said source to said gates,
(i) a control voltage source and an impedance connected in series with said control winding, said impedance having a potential thereon related to armature voltage, said control voltage opposing said potential and being related to a desired motor speed,
(j) and current limiting means having an input coupled to the armature winding and adapted to provide additional current in said bias winding when the armature winding current exceeds a predetermined value by allowing a portion of the armature current to flow in said bias winding and combine therein with current provided by said reference voltage source.

5. A shunt motor control circuit comprising:
(a) an alternating current source having first and second terminals,
(b) a first pair of oppositely-poled diodes connected in series between said first and second terminals,
(c) a second pair of oppositely-poled diodes connected in series between said first and second terminals to provide a full-wave bridge rectifier with said first pair,
(d) a field winding for said shunt motor connected between the juncture of said first pair and the juncture of said second pair,
(e) a pair of oppositely-poled controlled rectifiers connected in series between said first and second terminals to provide a full-wave bridge rectifier with said second pair, each of said controlled rectifiers including an anode, a cathode and a gate, the cathodes being connected together at a juncture,
(f) an armature winding for said shunt motor connected between the juncture of said cathodes and the juncture of said second pair of diodes,
(g) a pair of firing circuits for said controlled rectifiers connected in series between said juncture of said cathodes and said gates, each firing circuit including a secondary winding of a transformer coupled to said source along with a saturable core reactor and a diode connected in series,
(h) a bias winding encircling the cores of said reactors and connected to a bias voltage source through unidirectional conductive means,
(i) a control winding encircling the cores of said reactors and connected in series with a control voltage source and an impedance, said impedance exhibiting a potential opposing said control voltage and being related in magnitude to the armature voltage,
(j) and current limiting means having an input coupled to the armature winding and adapted to provide additional current in said bias winding when the armature winding current exceeds a predetermined level by allowing a portion of the armature current to flow in said bias winding and combine therein with current provided by said reference voltage source.

6. Apparatus according to claim 5 wherein said current limiting means comprises: a resistor serially connected between said armature winding and said juncture of said second pair of diodes; and a diode connected between the connection of said resistor and said armature winding and a point intermediate said unidirectional conductive means and said bias winding.

References Cited by the Examiner
UNITED STATES PATENTS

| | | | |
|---|---|---|---|
| 2,522,520 | 9/1950 | Knauth et al. | 318—345 |
| 2,537,676 | 1/1951 | Knauth et al. | 318—345 |
| 2,573,849 | 11/1951 | Knauth et al. | 318—345 |
| 2,753,506 | 7/1956 | Elliot | 318—345 |
| 2,754,463 | 7/1956 | Hansen et al. | 318—434 X |
| 2,899,620 | 8/1959 | Anger et al. | 318—345 X |

ORIS L. RADER, *Primary Examiner.*